Jan. 5, 1954

E. L. ALLEN 2,665,156

DOOR CONTROL MECHANISM

Filed Feb. 12, 1949

INVENTOR.
EDWIN L. ALLEN
BY
Bosworth & Sessions
ATTORNEYS

Jan. 5, 1954

E. L. ALLEN 2,665,156

DOOR CONTROL MECHANISM

Filed Feb. 12, 1949

*INVENTOR.*
EDWIN L. ALLEN
BY
*ATTORNEYS.*

Jan. 5, 1954 E. L. ALLEN 2,665,156
DOOR CONTROL MECHANISM
Filed Feb. 12, 1949 8 Sheets-Sheet 7

INVENTOR.
EDWIN L. ALLEN
BY
ATTORNEYS

INVENTOR.
EDWIN L. ALLEN
BY
ATTORNEYS

Patented Jan. 5, 1954

2,665,156

UNITED STATES PATENT OFFICE 2,665,156

DOOR CONTROL MECHANISM

Edwin L. Allen, Cleveland Heights, Ohio, assignor, by mesne assignments, to Rudolph I. Schonitzer, Cleveland, Ohio Application February 12, 1949, Serial No. 76,023

10 Claims. (Cl. 292—216)

This invention relates to door control mechanisms and more particularly to apparatus for effecting and controlling the latching and locking of doors of the type commonly used on automotive vehicles.

The Rudolph I. Schonitzer United States Patents Nos. 2,094,413 and 2,156,874 disclose certain door control mechanisms which have been extensively and very successfully used in connection with automobile bodies. The present invention relates to improvements in the general class of door control mechanisms illustrated in said Schonitzer patents.

Reference is also made to my co-pending United States patent applications, Serial Nos. 746,521, 760,074 and 769,688 (now Patent No. 2,480,688) which disclose and claim certain arrangements which are also incorporated in the apparatus herein illustrated and described. Some features of the present invention are so related to my said application Serial No. 769,688 (now Patent No. 2,480,688) that this application constitutes a continuation in part thereof.

The class of door control mechanisms to which the present invention is primarily directed may be broadly described as having co-acting elements associated respectively with a door and its door frame structure whereby the door may be latched and held in closed position or released from closed position to permit opening thereof, and as including detent means whereby one of the co-acting elements, which may be termed the latch member, is releasably retained in operative or door latched position when the door is closed. When the detent means of this type door control mechanism is actuated by a manually operable device, such as a push button or handle, to release the latch member and permit opening of the door the latch member is moved into operated or door unlatched position concurrently with opening movement of the door and normally remains in unlatched position until the door is shut whereupon the latch member is moved to latched position by the closing movement of the door.

The present invention contemplates latch mechanism supported in a suitable frame structure and having a latch member (illustrated as a bifurcated arm but which may be of the gear or other type) pivotally mounted thereon for movement between latched and unlatched position. Associated with the latch member and movable therewith is a latch element and the mechanism further includes a detent member adapted to block and hold the latch member and element in latched position. This detent member may also be used to limit the movement of the latch arm and element in unlatching direction. The invention further contemplates a compact, rugged and relatively inexpensive assembly with the parts so arranged and proportioned that a smoothly operating, long lived mechanism is obtained. The detent is effectively supported and guided and improved means are provided for locking the latch against unauthorized operation. The locking means is also especially well adapted to automatic locking operation whereby it may be pre-set when the door is open so that the lock will automatically become effective upon closing the door. The lock mechanism may also be arranged to be automatically unlocked upon operation of the inside remote control to release the latch for door opening. Another feature of the present invention is the provision of means which permit variation, within rather wide limits, of the location of an outside manually operated actuating element relative to the location of the latch mechanism in the door.

The above and other features and objects of my invention will appear from the following description of several embodiments thereof, reference being had to the accompanying drawings in which.

Figure 2:
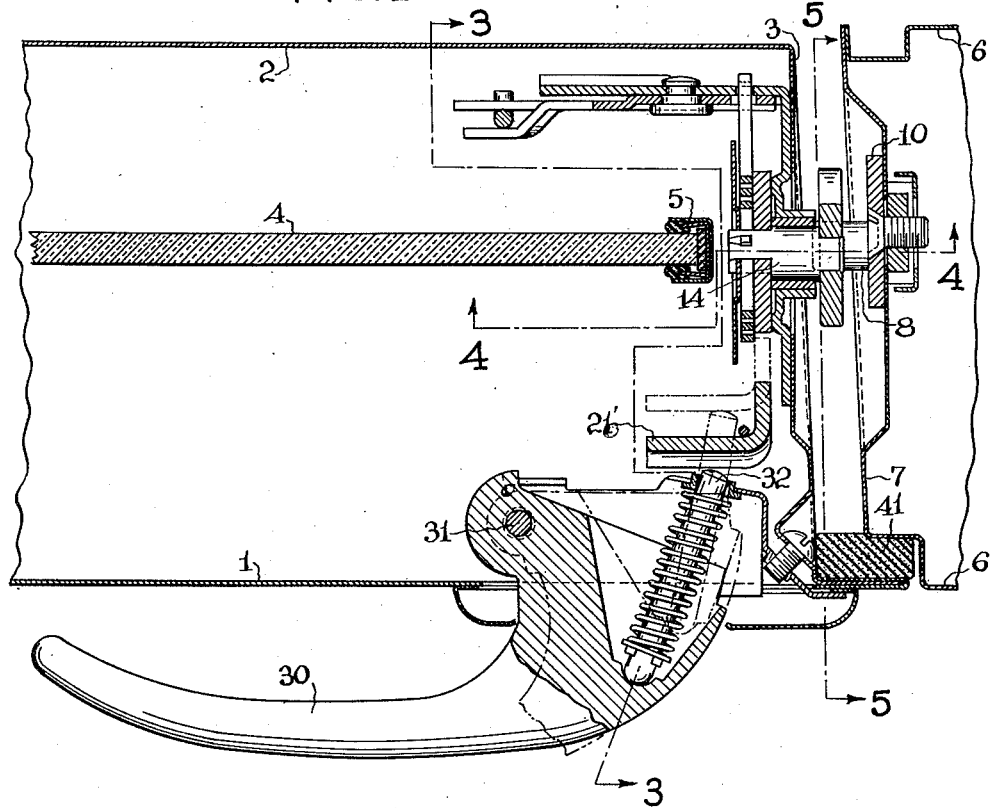
Figure 2 is a horizontal cross-sectional view taken on line 2—2 of Figures 1 and 3.
Figure 4:
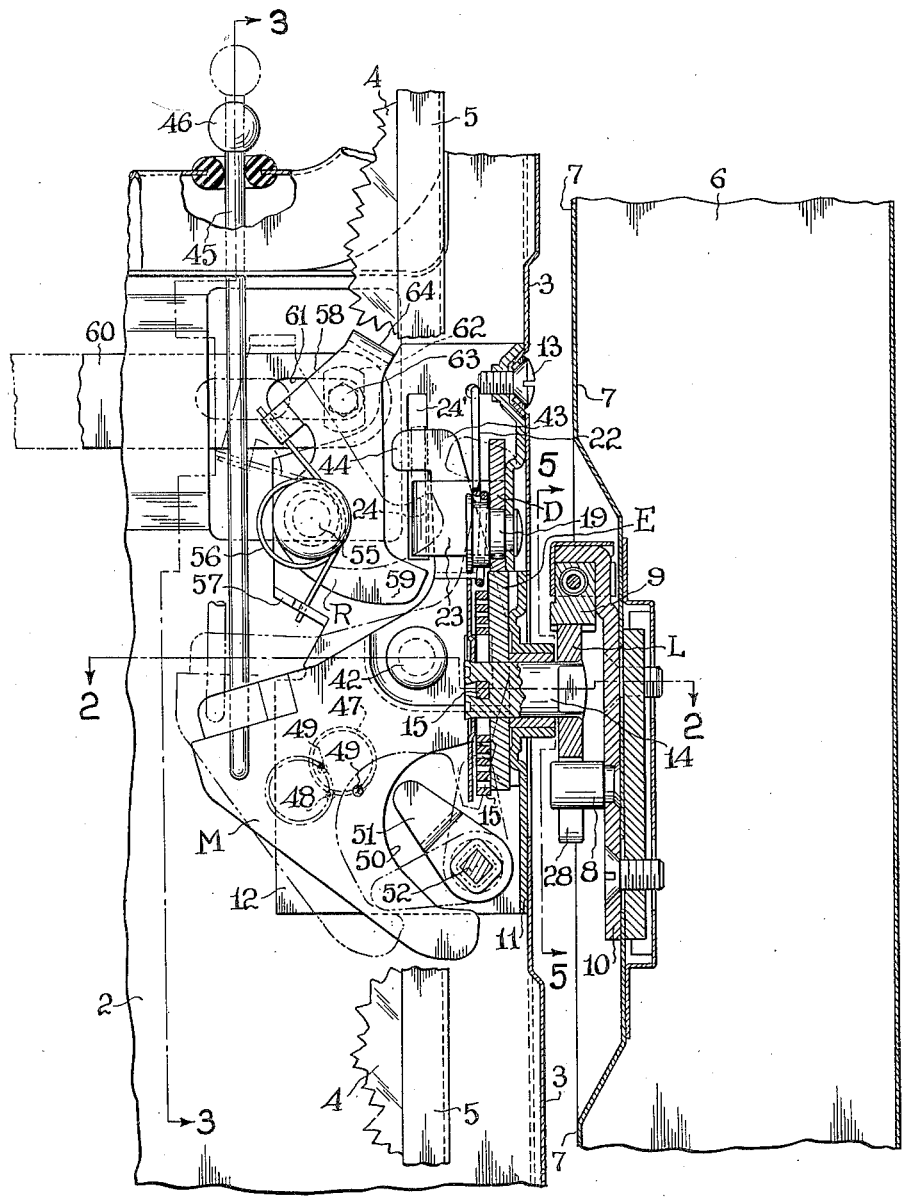
Figure 4 is a vertical cross-sectional view taken substantially on line 4—4 of Figures 2 and 3.

Referring now to the drawings, the outside panel of a typical automobile door is illustrated at 1, the inside door panel at 2 and the free edge-wall of the door at 3. The usual window glass is seen at 4 supported in a glass-run channel 5. In Figures 2 and 4, the door is in closed position and the door frame structure includes the body pillar 6, having an edge face 7 which carries the keeper pin 8 and the door support wedge member 9. The keeper pin 8 and the wedge 9 are mounted on a base plate 10 which is adjustably secured to the edge wall 7 of the body pillar by means which need not be further described here as they form no part of the present invention but may advantageously be of the type shown in my co-pending United States patent application Serial No. 23,296 now abandoned.

Figure 3:
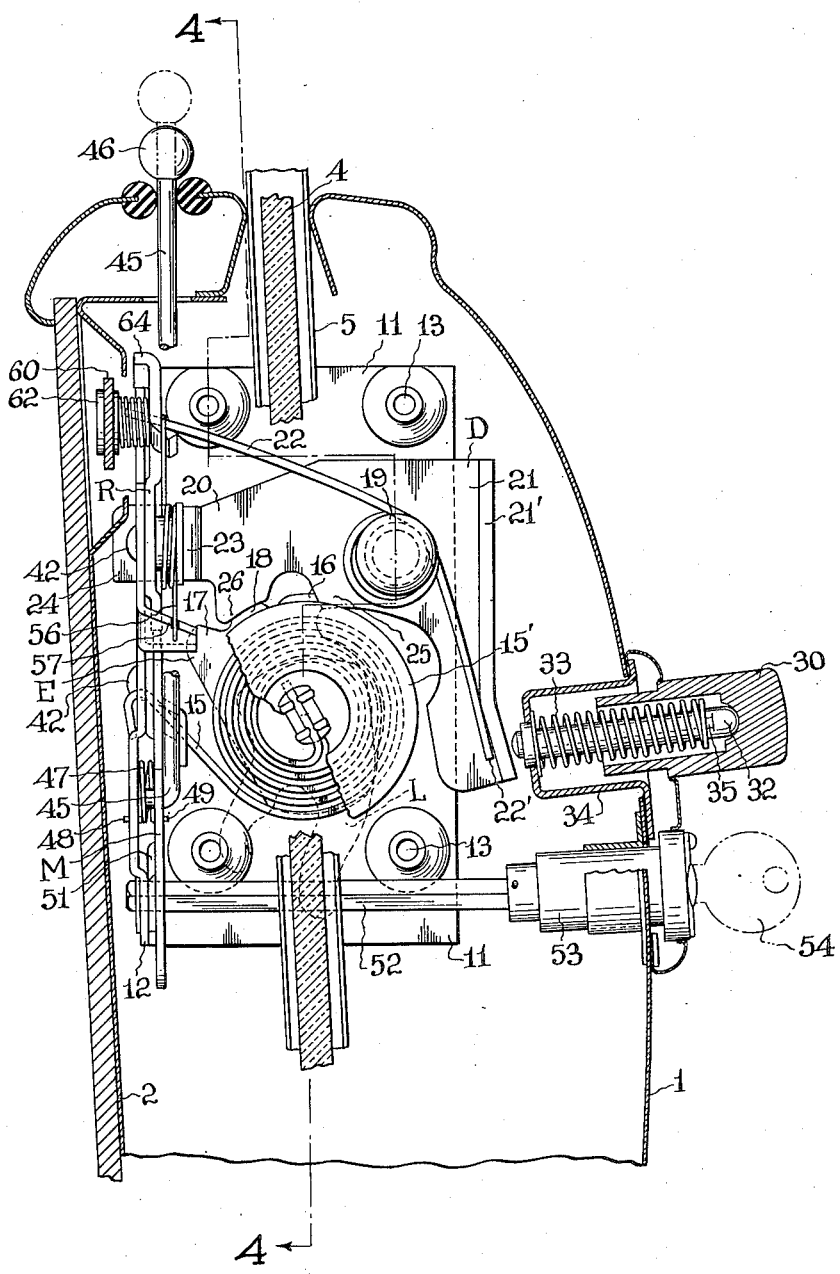
Figure 3 is a vertical cross-sectional view, taken substantially on line 3—3 of Figures 1 and 2, the latch mechanism being illustrated in door latched and locked positions.

Referring particularly to Figures 3 and 4, the latch mechanism comprises a frame structure having a base plate portion 11 and a side flange portion 12, the base plate 11 being secured to the free edge-wall 3 of the door as by screws 13. The side flange 12 is angularly disposed relative to the base plate 11 and extends away from the free edge-wall 3 in a direction generally parallel to the inner door panel 2.

Rotatably supported in a suitable bearing in the base plate 11 is a latch shaft 14 having a latch member L secured to its outer end and a latch element E secured at its inner end on the opposite side of base plate 11. It will be noted from Figure 4 that the latch member L is disposed on the outside of the door free edge-wall 3 while the latch element E is disposed on the inside of the door free edge-wall.

A spiral spring 15, has its inner end secured to the shaft 14, as by clinching in a slot in the end of the shaft, and its outer end anchored in a suitable aperture in the side flange 12. Spring 15 is protected by a cover disc 15' also clinched on the inner end of shaft 14. This spring 15 urges the shaft 14, element E, and latch member L toward unlatched position (clockwise as seen in Figures 3 and 9 to 13 inclusive). Latch element E, as is best seen in Figures 9 to 12 inclusive, includes a latching abutment member 16, a circumferentially spaced limiting abutment member 17, and a secondary latching abutment member 18 between said abutments 16 and 17.

Pivotally mounted on a pin 19 carried by the base plate 11 is a detent member generally indicated at D in the embodiments illustrated in Figures 1 to 15 inclusive. The detent member D is of generally L-shape having a transversely extending arm portion 20 and a longitudinally extending arm portion 21 provided with an edge flange 21'. Surrounding the pin 19 and held in place by an enlarged head thereon is a detent spring 22 having its lower end 22' engaging the flange 21' of longitudinal arm 21 and its upper end anchored in a suitable aperture in the side flange 12. This spring tends to urge the detent D about its pivotal support 19 towards latch holding position (counterclockwise as seen in Figure 3 and Figures 9 to 12 inclusive).

The outer end of transverse arm portion 20 of detent D is offset at 23 (see Figure 4) in a direction away from base plate 11 and has an outer end portion 24 which extends through an elongated detent guide slot 24' in side flange 12 for vertical movement therein. The detent D is also provided with a latch holding abutment 25 (see Figures 9–12) and, outwardly spaced therefrom, a stop shoe 26 which, as will appear later, limits movement of the detent in latching direction.

Figure 9:
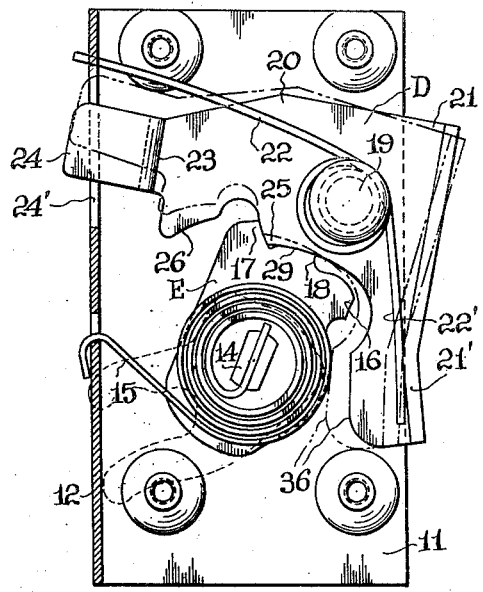
Figure 9 is an illustrative view of the latch mechanism of Figures 2, 3 and 4 with certain parts omitted for clearness of illustration and illustrating the operated or unlatched portions of the latch element and detent.

The latching operation of the mechanism described above may be best understood by referring to Figures 9 to 12 inclusive. In Figure 9 the parts are shown in their door unlatched positions which they assume when the door is open and the latch mechanism is in unlatched or operated position. When the door is moved toward its closed position the arm portion 27 of latch member L strikes the keeper pin 8 (as illustrated in phantom lines in Figure 5) and, as the door continues to close, is swung about its pivotal support in counterclockwise direction (as seen in Figures 9 to 12). This causes the point or corner of the latch holding abutment 25 of detent D to ride over the surface 29 of the latch element E until it reaches the secondary abutment member 18 whereupon it drops down into the position shown in Figure 10.

Figure 5:
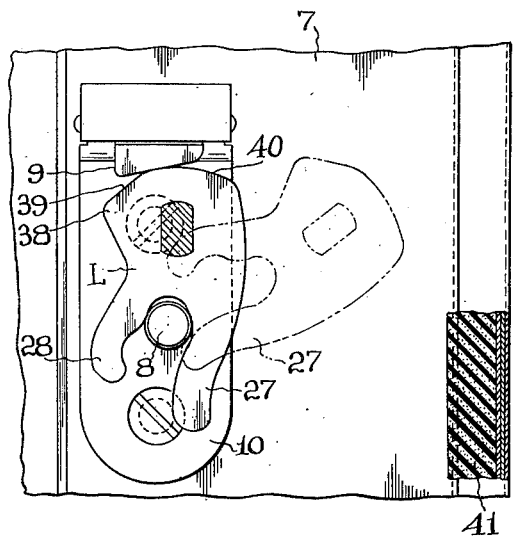
Figure 5 is a vertical cross-sectional view taken substantially on line 5—5 of Figures 2 and 4.
Figure 6:
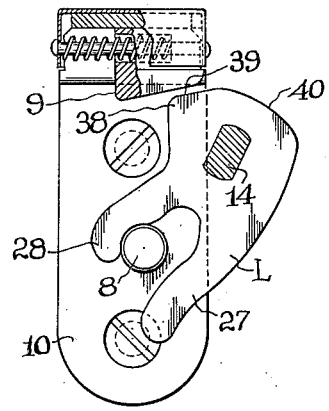
Figure 6 is a view generally similar to Figure 5 but omitting the door frame structure and illustrating the latch member in its secondary latched position.
Figure 10:
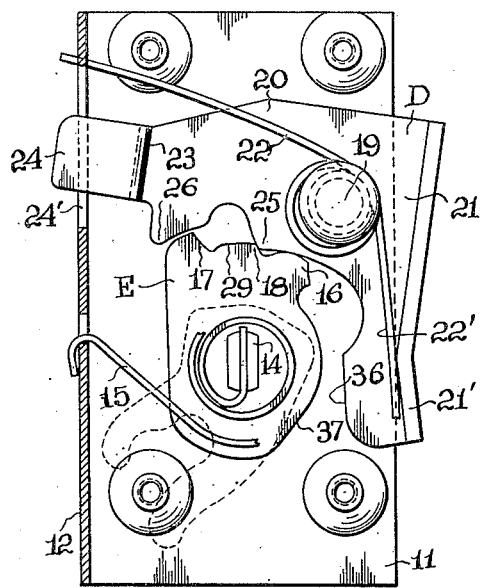
Figure 10 is a view similar to Figure 9 but illustrating the parts in their secondary latch positions.
Figure 11:
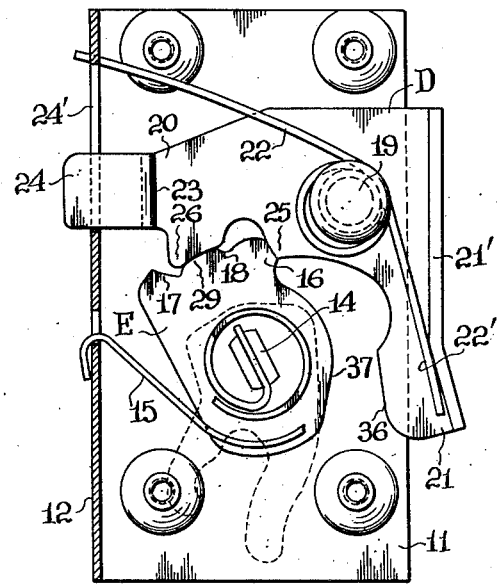
Figure 11 is a view similar to Figure 9 but illustrating the parts in latched position.

This is the so-called "secondary" or safety position in which, as seen from Figure 6, the arm 28 of latch member L is held against opening of door by the keeper 8 but, as the door is not fully closed, proper latching is not effected and the door will be loose and may rattle. The door normally stops in this secondary position only if it is not closed with sufficient force. In ordinary usage, the abutment portion 25 of detent D continues through the position shown in Figure 10 without hesitation until the corner of abutment 25 reaches the corner of the abutment 16 on element E whereupon detent spring 22 moves the detent and abutment 25 thereof into door latched position as seen in Figure 11. The stop shoe 26 on the transverse arm 20 of detent D engages the face portion 29 of element E to limit the movement of the detent in latch holding direction. As seen in Figure 11 this limitation preferably occurs before the outer end portion 24 of transverse arm 20 strikes the bottom edge of guide slot 24'. When the parts are in latched position as seen in Figures 5 and 11, the latch member L, shaft 14, and latch element E are blocked against rotation in unlatching direction (clockwise in Figure 11 by the abutment 25 of detent D.

Figure 1:
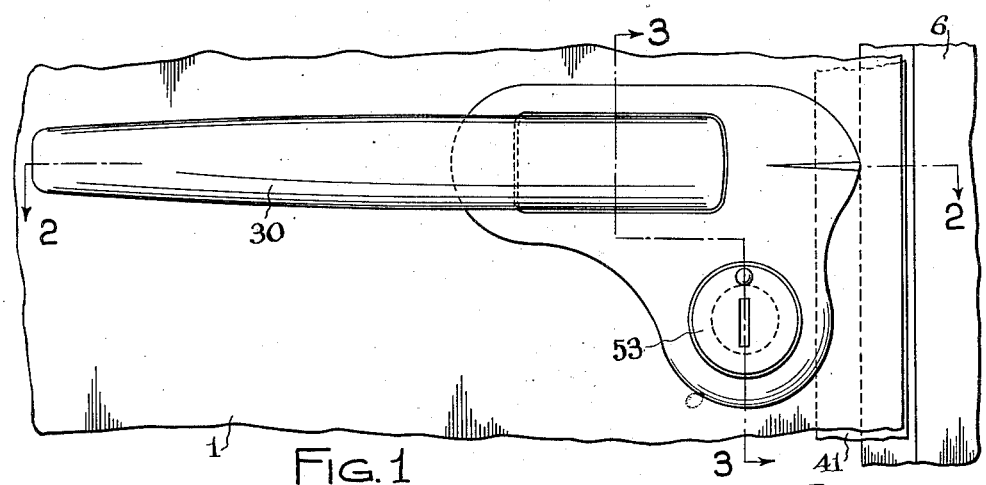
Figure 1 is a fragmentary side elevation of a portion of an automobile door and door frame in which my improved latch mechanism is embodied.

To release the latch and permit the door to be opened requires that the detent D be moved in clockwise direction (Figure 3) as by pressure on the flange 21' by operating handle 30 or other actuating device such as a push button or the like. As seen in Figures 1, 2 and 3, handle 30 is pivotally mounted on the door structure at 31 and engages a plunger 32. Spring 33 acts between the guide frame 34 and a shoulder 35 on plunger 32 (Figure 3) and tends to hold the plunger 32 and the handle 30 in idle or non-operating positions as seen in Figures 1, 2 and 3. When the handle 30 is grasped and pulled outwardly the plunger 32 moves inwardly against spring 33 and engages flange 21' of detent D causing it to move in clockwise direction (Figures 3 and 11), thus moving abutment 25 out of latch holding position in relation to abutment 16 of element E and permitting the latch spring 15 and/or the opening movement of the door, to move the latch member L back into its operated or unlatched position as seen in Figure 9.

During this movement into unlatched position the limiting abutment member 17 on element E engages the detent abutment 25 thus stopping the element E and latch member L in the position indicated in Figure 9 (and in phantom lines in Figure 5) in which latch member L is accurately oriented to obtain proper closing engagement with keeper 8 when the door is shut. Thus the abutment 25 on detent D serves the dual purpose of holding the latch mechanism in latched position and preventing opening of the door and also of accurately blocking and locating the latch mechanism in its proper operated or door unlatched position.

The longitudinal arm portion 21 of detent D is arranged to provide stop means for limiting the movement of the detent D in latch releasing direction. Thus detent D may be moved from its normal latch released position of Figure 9 into the position indicated in phantom lines in Figure 9 in which the edge 36 of the lower end portion of longitudinal arm 21 has engaged the surface 37 of element E. It will also be noted from Figure 9 that the movement of the detent D in latch releasing direction is stopped by engagement of edge 36 with surface 37 prior to disengagement of the abutment 25 with the limiting abutment 17. The faces of abutments 25, 16, 17 and 18 are formed on an arc, the center of which is the pivotal center of support of detent D. Thus there is no possibility of element E and latch member L moving in unlatching direction beyond their desired and predetermined operated or unlatched positions and ease of operation of detent D and proper relatching is at all times assured while close manufacturing tolerances are avoided.

The above noted Schonitzer Patent No. 2,156,874 illustrates a pivoted latch member of the general type shown herein having a door holding face adapted to co-act with a movable wedge, supported on the door frame, to prevent vertical movement of the free edge of the door when the door is closed and latched. The latch of the Schonitzer patent however, did not include a "secondary" or safety position in which, although the door is held against opening, it is not fully closed. In order to prevent vertical movement of the latch member L of the present device (and of the door by which it is carried) in a direction transverse to the opening and closing movement of the door when in the "secondary" position such that arm 28 of latch member L might jump over the keeper pin 8 and permit opening of the door, I have provided projection 38 on keeper L having a secondary holding face portion 39 extending inwardly or in door closing direction from the primary door holding face portion 40 of latch member L. As is seen in Figure 5, when the door is in its closed and latched position the inner part of face 40 engages sliding wedge 9 and thus the latch member L is firmly held against vertical movement by engagement with both the pin 8 and wedge 9.

Figure 6 shows the latch member L, keeper 8 and sliding wedge 9 in the positions they assume when the door is in its secondary latched position. Wedge 9 is at the outermost end of its transverse travel and it is observed that the primary door holding face 40 is out of vertical alignment with wedge 9. Thus primary face 40 is not effective when the door is in its secondary latched position to prevent vertical movement of the free edge of the door which might result in unlatching due to the arm 28 jumping over the keeper pin 8. Such unlatching however is effectively prevented by the projection 38 and the secondary door holding face 39 thereon which, as seen in Figure 6, is directly below and slightly spaced from the bottom of wedge 9 and aligned therewith in a direction transverse to the opening and closing movement of the door when the parts are in the secondary latched position. With this arrangement the maximum possible vertical movement of latch member L relative to pin 8 when in secondary position is equal to the clearance between face 39 and the lower surface of wedge 9. As this distance is substantially less than the vertical overlap of arm 28 with pin 8, as seen in Figure 6, release of the door when in secondary position due to weaving or warping of the body or frame is positively prevented while the normal door holding operation of the primary face 40 and sliding wedge 9 is not interfered with.

Figure 7:
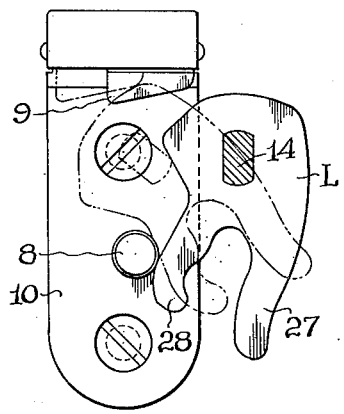
Figure 7 is a view similar to Figure 6 but illustrating the effect of an attempt to close the door with the latch member in latched position.
Figure 12:
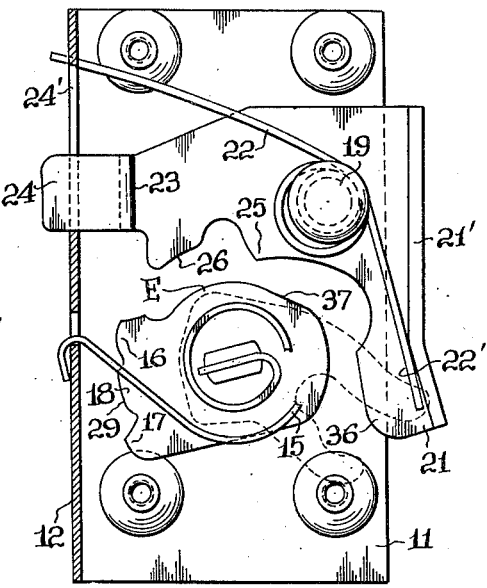
Figure 12 is a view similar to Figure 9 but illustrating the manner in which the latch member and latch element may over-ride or move beyond their normal latched positions to protect the mechanism from injury under certain conditions which will be later described.

As previously explained, latch member L is seen in phantom lines in Figure 5 in unlatched position and in full lines in latched position. Figure 7 illustrates what may take place if the latch member L is inadvertently moved into latched position when the door is open and the door is then swung in an attempt to close same. The full line position of latch member L (Figure 7) shows the outer edge of arm 28 striking the keeper pin 8 as would occur in the circumstances just described. When this happens the latch member L is merely rotated in latching direction (counter-clockwise as seen in Figures 7, 11 and 12) from the position shown in full lines in Figure 7 and in Figure 11 into a position somewhat as illustrated in phantom lines in Figure 7 and in Figure 12.

During this over-riding movement spring 15 is wound up and opposes rotation of the latch member L, thus providing a resilient cushion which effectively prevents damage either to the latch mechanism, the keeper structure, or the door.

Figure 8:
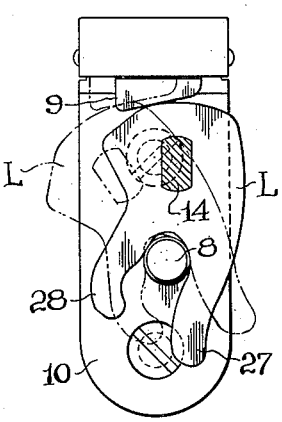
Figure 8 is a view similar to Figures 6 and 7 but illustrating the manner in which the latch member may overrun its normal latched position to accommodate wear of the weather seal or other exceptional conditions.

The same provision for over-riding movement of latch arm L and element E is also of value in accommodating possible movement of the door in closing direction beyond the normal closed position shown in Figure 8. If the resilient weather seal 41 (Figure 2) should become worn in use or removed or damaged in some manner it would not serve to stop inward closing movement of the door at the proper location. Thus when the door was slammed and the latch member moved into latched position as seen in full lines in Figure 8, continued movement beyond the normal latched position of the mechanism might result in overriding of the latch member L until it reaches a position as indicated in phantom lines in Figure 8. Such over-riding, however, merely results in winding up of spring 15 and further movement of wedge 9 to the left (Figure 8) without shock or injury to any part of the door control apparatus and with an immediate return to normal latched position by spring 15.

It is of course desirable in automobile door control mechanisms that means be provided for preventing unauthorized opening of the door when desired. The present latch mechanism incorporates a particularly compact, rugged, and effective locking means which is readily susceptible to modification to provide different modes of operation or means for control of the lock mechanism. Referring particularly to Figure 4, the locking member M is pivotally supported on the side flange 12 of the frame structure by a pin 42. The upwardly extending lock arm portion 43 of member M has a projection 44 at its upper end which, when in the locked position seen in full lines in Figure 4, is disposed to overlie the end portion 24 of transverse arm 20 of detent D and prevent upward movement thereof sufficient to move detent latch holding abutment 25 out of engagement with latching abutment 16 of element E. Any attempt to move detent D out of latched position when lock member M is in its locked position of Figure 4 will merely result first in taking up the clearance between end portion 24 and projection 44 and then in a force on arm 43 in a direction tending to cause counterclockwise rotation (Figure 4) of lock member M, thus more firmly maintaining it in locking position. A large clearance between detent portion 24 and lock projection 44 is possible with the arrangement described and is desirable in eliminating costly accuracy in manufacture and assembly and providing a more fool-proof latch mechanism.

Member M may be moved from its full line locking position of Figure 4 into its phantom line unlocked position by means of the operating rod 45 and knob 46 which is customarily mounted on the inside of the door adjacent its free edge. Lifting knob 46 (Figure 4) will swing member M in clockwise direction about its pivot pin 42 until the lock arm portion 43 thereof strikes the base plate 11 of the frame. In unlocked position projection 44 is completely withdrawn from the vertical path of end 24 of detent D. The offset arrangement of the inner end of transverse arm 20 of detent D permits the lock arm 43 to be disposed between the base plate 11 and the transverse arm 20 and also permits locking movement to be in a direction away from the base plate.

In order to maintain locking member M either in its locked or unlocked positions a snap-over spring 47 is preferably employed having one end 48 anchored in the side flange 12 and the other end 49 engaging member M. In the full line position (Figure 4) spring 47 is urging member M in counterclockwise or locking direction while in the phantom line position the end 49 of spring 47 has moved across the common center line connecting pivot pin 42 and fixed end 48 of spring 47 and thus urges member M in clockwise or unlocking direction.

At the lower end of lock member M is a generally C-shaped recess 50 the edge face of which is adapted to be engaged by a swinging arm 51 rotatably supported in side flange 12 and adapted to be turned by a square shaft 52. As is clearly seen in Figure 3, shaft 52 extends to a cylinder lock 53 of usual and suitable form which is supported by the outer panel 1 of the door. Rotation of the key 54 effects corresponding rotational movement of swinging arm 51 and the contour of C-shaped recess 50 is such that movement of arm 51 from its neutral full-line position of Figure 4 downwardly into its lower phantom-line position will cause the end of arm 51 to engage the inner edge of recess 50 swinging the locking member M, if in locked position, in clockwise direction into unlocked position. The cylinder lock 53 is of the type in which the key must always be returned to a central or neutral position before it can be removed, and thus, when the key is out of the lock, the arm 51 is always in its central or neutral position seen in full lines in Figure 4.

If the lock is unlocked (phantom-line position of Figure 4) and it is desired to lock same from the outside of the door it is only necessary to turn the key to rotate arm 51 from its neutral full-line position of Figure 4 into its upper phantom-line position during which movement arm 51 will engage the upper end of the C-shaped recess and swing locking member M into locked position. With this arrangement the locking mechanism may be operated either from inside of the door by knob 46 or from outside of the door by key 54 at any time to effect either locking or unlocking of the door without regard to the position which the locking member M may have been placed in previously.

When the latch member L is unlatched detent arm end 24 is lifted as seen in Figure 9. Arm 24 is also lifted, but to a somewhat lesser degree when the latch member L is in secondary latched position as seen in Figure 10. When in either its unlatched or secondary latched position arm 24 blocks the projection 44 on lock member M out of locked position and thus latch member M cannot be effective to lock the door except when it is in fully closed and latched position.

In order to permit unlatching of the door from inside of the vehicle I provide remote control means which includes a bell-crank lever R (Figure 4), pivotally supported on a pin 55 by side flange 12 and normally urged in clockwise direction (Figure 4) by a spring 56 anchored at one end in a flange 57 bent inwardly from side flange 12 and secured at its other end to the upper leg 58 of bell crank R. The lower or operating leg 59 of bell crank R extends toward base plate 11 and when in retracted or non-operating position has its end portion disposed below and spaced from the outer end 24 of transverse arm 20 of detent D. The actuating strap or bar 60 has an elongated slot 61 adapted to be slipped over the vertically extending T-head 62 of stud 63 carried by the upper end of leg 58 of bell crank R. In installing strap 60 the slot 61 is aligned with the T-head 62 and slipped thereover and the strap is then rotated into final position as seen in Figure 4. Suitable operating means such as a handle or the like (not shown) on the inside of the door are provided to apply a pull to the strap 60. When this is done bell crank R is rotated in counterclockwise direction (Figure 4) and lower leg 59 thereof engages the underside of end portion 24 of transverse arm 20 of detent D and lifts same to effect release of the latch mechanism and permit opening of the door. Upon release of the strap 60 spring 56 returns bell crank R to retracted position, the portion 64 of upper leg 58 engaging the edge of side flange 12 to limit retractive movement. In Figure 4 the parts just described are shown in full lines in their retracted or non-operating positions and in phantom lines in their latch-releasing positions, it being understood, of course, that bell crank R cannot be operated to release the latch except when lock member M is in unlocked position.

Figure 13:
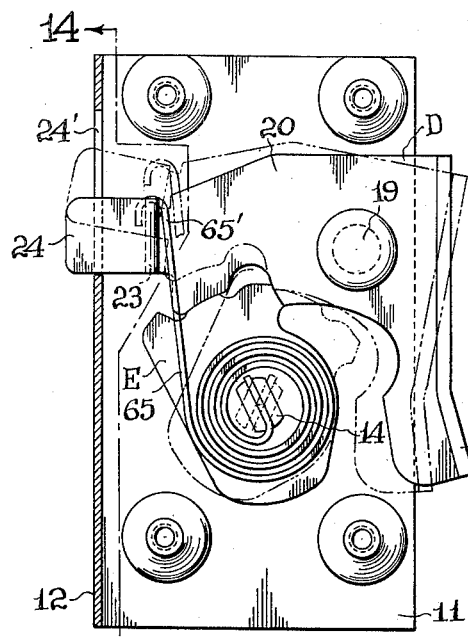
Figure 13 is a view generally similar to Figure 11 but illustrating a modified form of my mechanism in which a single spring is employed for operating the latch member and the detent.

Figure 13 illustrates a modified arrangement of detent D and latch element E wherein a single spring 65 is employed to provide means for rotating the element E and latch member L in unlatching direction and for urging the detent in latch holding direction. Spring 65 is of spiral form, generally similar to spring 15, and has its inner end attached to shaft 14 in the manner previously described. The outer end portion 65' extends upwardly and is hooked over the offset 23 of transverse arm 20 of detent D. With this arrangement movement of detent D from full line latched position of Figure 13 into phantom line unlatched position will be against the spring 65 which will at all times tend to return detent D to latched position. In like manner spring 65 at all times tends to rotate element E and latch member L in unlatching direction, clockwise as seen in Figure 13.

Figure 14:
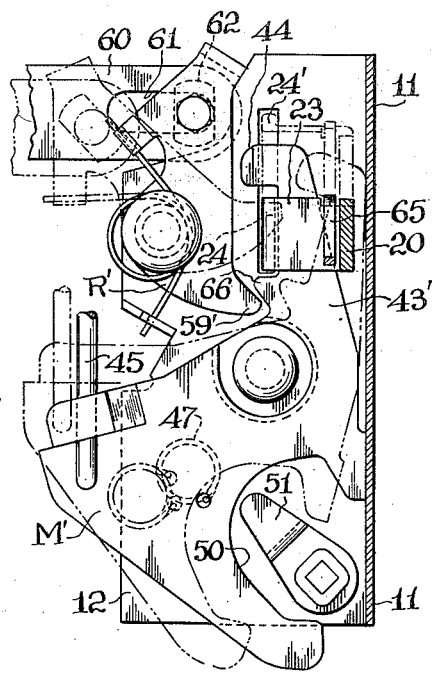
Figure 14 is a view taken substantially on the plane indicated by line 14—14 of Figure 13 but illustrating another modified form of my invention whereby operation of the latch from the inside of the door by the remote control mechanism automatically unlocks the latch if it has been locked.

In Figure 14 I have illustrated a modification whereby, without adding additional parts or substantial cost to the mechanism, means are provided for positively and automatically effecting unlocking of the locking member M' upon operation of the remote control mechanism to unlatch the door. This is considered desirable in some instances as, if the door has been locked from the inside by pushing down on the knob 46 and an emergency occurs which requires immediate opening of the door the passenger's first reaction may be to grasp the remote control handle and operate it to release the door. With the arrangement shown in Figures 2 and 4 unlatching movement of the remote control means is not possible when the door is locked. This may cause the loss of valuable time in getting the door open and to overcome this I have shown in Figure 14 a locking member M' which is substantially identical with locking member M except that it is provided with an automatic unlocking projection or cam 66 extending from the edge of lock arm 43' and disposed between the lower or operating leg 59' of bell crank R' and the bottom edge of end portion 24 of detent D.

As seen in full lines in Figure 14, the lock member M' is in locking position, the detent is in latch holding position and the remote control bell crank R' is in retracted or non-operating position. If a pull is exerted on strap 60 to swing bell crank R' in counterclockwise direction the end 59' thereof will first engage the automatic unlocking projection 66 on lock arm 43' swinging the lock arm and the entire lock member M' out of locked position into unlocked position (seen in phantom lines in Figure 14). The end of leg 59' may then clear the outer end of projection 66, it being understood that snap-over spring 47 has the same action as previously described, and further movement of bell crank R' will result in lifting end 24 of transverse arm 20 of detent D with consequent unlatching of the latch mechanism. Of course if locking member M' is in its phantom line unlocked position the remote control bell crank R' will operate in its normal manner to release the detent. It will be understood that the extremely effective, compact and economical automatic unlocking mechanism described above does not in any way change or interfere with the operation of the outside key controlled lock actuating means, the inside locking rod 45 or the snap-over spring 47. It will also be clear that, although Figure 14 is taken substantially on the plane of line 14—14 of Figure 13 and illustrates a latch with a single spring for actuating the detent and the latch arm, my improved automatic unlocking mechanism is equally adapted for use with the embodiment of Figures 2 to 12 inclusive, in which independent detent and latch member springs are employed.

Figure 15:
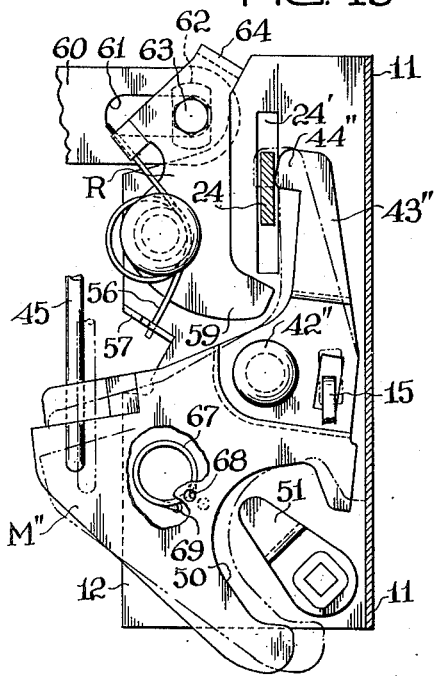
Figure 15 is a view generally similar to Figure 14 but illustrating another modification whereby lock member may be pre-set for automatic locking upon closing of the door.

My above noted co-pending United States patent application Serial No. 769,638 (now Patent No. 2,480,688) discloses and claims a latch mechanism which incorporates means whereby the locking member may be pre-set in an intermediate position in which it is urged towards locked position but in which it is blocked out of locked position when in unlatched or secondary latched positions and until the latch member substantially reaches its fully latched or door completely closed position. Means for accomplishing this desirable result may conveniently be incorporated in the present mechanism and Figure 15 illustrates such an embodiment. The locking member M'' is supported in the same manner as previously described and is substantially identical with the locking member M of Figure 4 except that the locking projection 44'' of Figure 15 is somewhat shorter than the corresponding locking projection 44 of member M. Furthermore, the snap-over spring 67 is so arranged that the end 68 thereof, which acts on member M'', passes over the common center line between pivot pin 42'' and fixed end 69 of spring 67 at an earlier point in the travel of the lock member M'' toward locked position than previously described.

In the embodiments of my invention shown in Figures 1 to 14 inclusive the spring 47 is arranged to urge the locking member M or M' toward its unlocked position at all times when projection 44 lies between its completely withdrawn or unlocked position (phantom lines in Figures 4 and 14) and a point where the end of projection 44 lies between the plane of the side of end portion 24 of detent D which is effective to block projection 44 out of locked position when detent D is in unlatched or secondary latching position and its locked position (full lines in Figures 4 and 14). Thus with the devices of Figures 1 to 14 inclusive, if the operator pushes down on knob 46, or turns the outside key 54, when the latch is unlatched (Figure 9) or when it is in its secondary latched position (Figures 6 and 10) the projection 44 will strike and be blocked by the side face of end 24 of the detent. As the snap-over spring 47 has not as yet changed its direction of effort release of the knob 46 will result in lock member M returning to full unlocked position with consequent lifting of the button 46.

In the device of Figure 15 however, the spring 67 is so arranged that the snap-over action takes place at a point between the full unlocked position (with arm 43'' back against the base plate 11) and its blocked position (seen in full lines in Figure 15) in which the projection 44'' is blocked against further movement in locking direction by end portion 24 of the detent D. Projection 44 will be so blocked by end portion 24 during such time as the latch member L is in unlatched position, while it is in or passing through secondary latched position, and substantially up to the point at which it reaches its full latched position and the detent D moves into latch holding position. When detent D does move into latch holding position end portion 24 drops downwardly in guide slot 24' into a non-blocking position, as seen in Figures 4 and 14, whereupon spring 67 immediately snaps the lock member M into locked position (as seen in phantom lines in Figure 15) with projection 44'' overlying end portion 24 and effectively preventing release of the latch.

With the arrangement just described the operator may, when the door is open and the latch is in unlatched position, push down on the button 46 thus moving latch member M'' from its unlocked position in which it is held by spring 67, through the snap-over point of spring 67 into the intermediate or pre-set position shown in full lines in Figure 15 in which spring 67 urges member M'' in locking direction but in which it is blocked out of locking position by arm 24. To lock the door the operator need now only push it shut and when the latch member L reaches full latched position (as seen in Figures 3 and 4) the lock member M'' will immediately snap into locked position. If, in pushing the door closed after pre-setting the lock as above described, the operator fails to exert enough force and the latch stops in its secondary position as seen in Figure 10, the lock member M'' and its projection 44'' will not move into locked position but will still be blocked out by the end 24 of detent D. Thus the operator can release the mechanism from an inadvertent secondary latched position by operating the outside handle in the usual manner and without having to take his key out of his pocket and unlock the mechanism. The next time he closes the door he of course will use greater force in order to move it through the secondary position into full latched position whereupon the lock member M'' will snap into locked position.

It will be understood that the automatic locking feature described above may also be incorporated in the mechanism of Figure 14, thus providing a lock which has both automatic unlocking action upon operation of the inside remote control and automatic keyless locking action by pre-setting the lock member and closing the door. Of course either or both of these features may be omitted from my improved lock mechanism in cases where they are not deemed desirable and it will be seen that these modifications can be effected without substantial change in manufacturing or material costs and without interfering in any way with the effectiveness, durability, or ease of operation of the mechanism.

Figure 16:
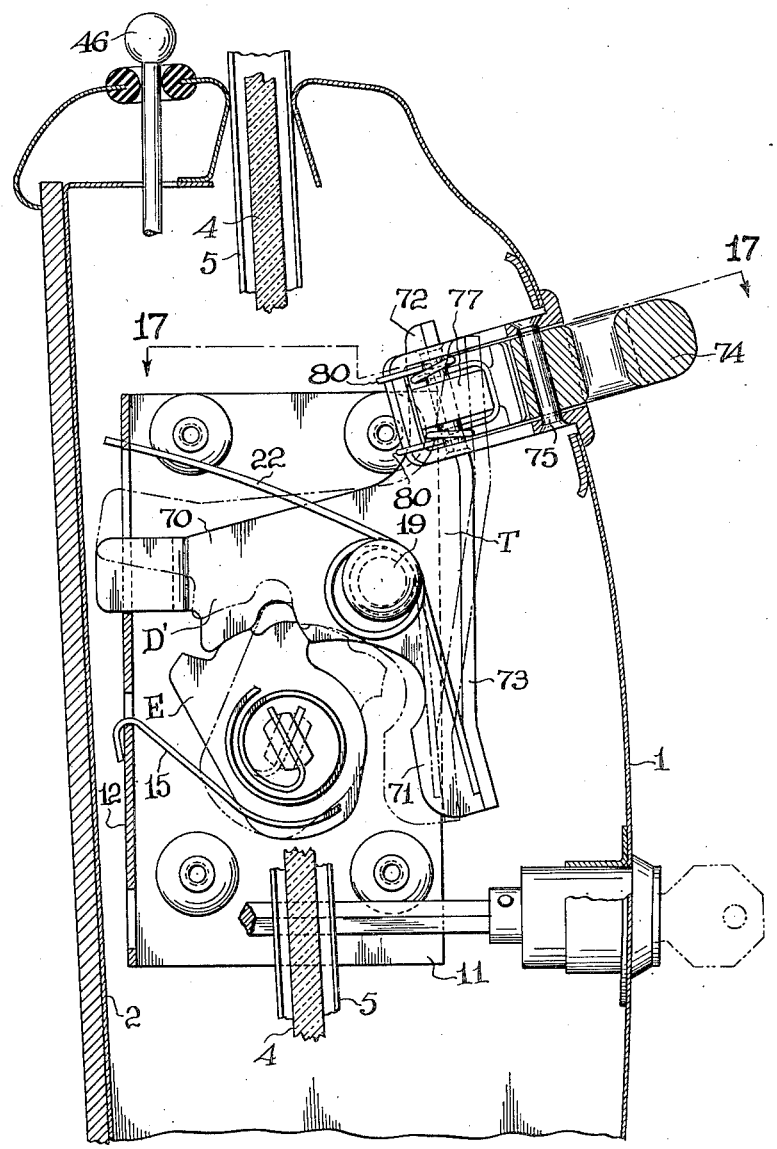
Figure 16 is a view generally similar to Figure 3 but illustrating a modified arrangement whereby the outside operating unit may be installed at a point substantially removed from the plane in which the latch member engages its keeper.
Figure 17:
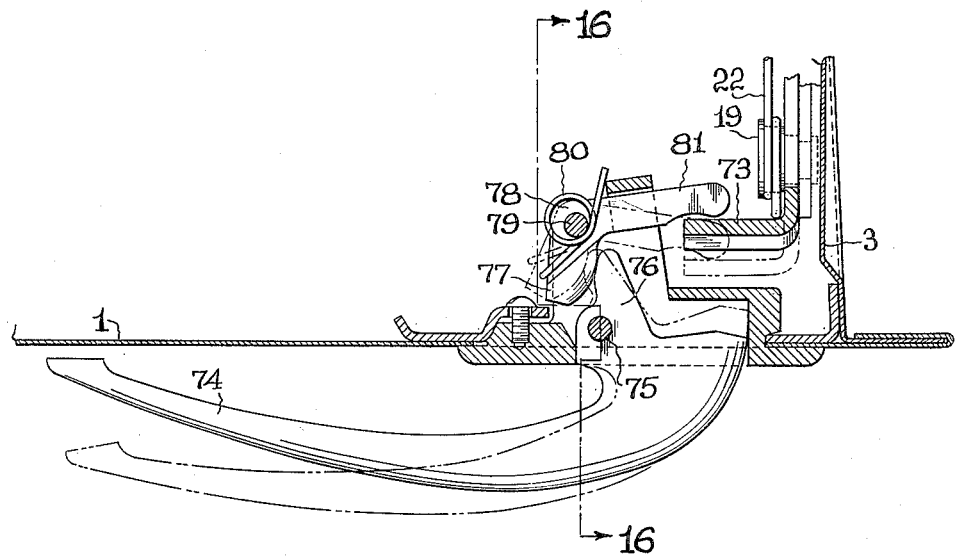
Figure 17 is a horizontal cross-sectional view taken substantially on line 17—17 of Figure 16 and illustrating an outside operating handle mechanism for the apparatus of Figure 16.
Figure 18:
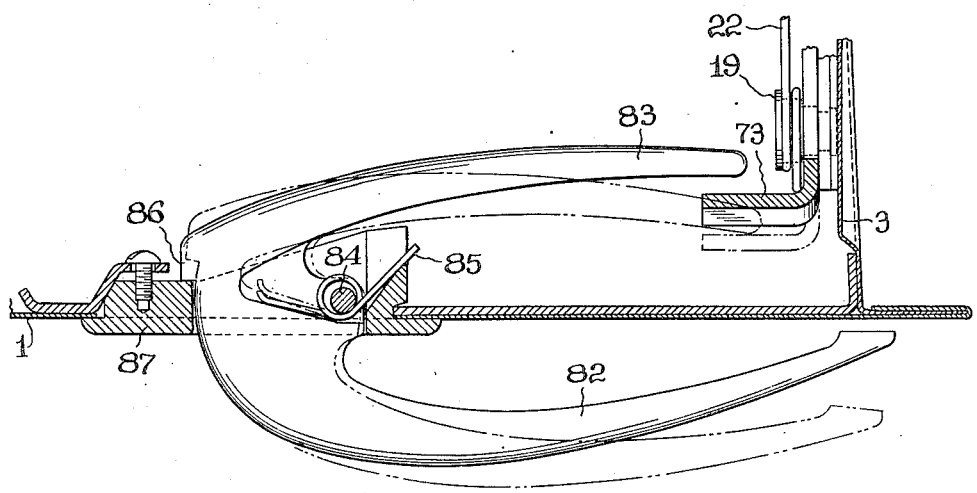
Figure 18 is a view similar to Figure 17 but illustrating a modified form of an outside handle mechanism.

In the latch mechanisms just described, and as is best seen from Figures 1, 2 and 3, the operating handle (or push button if used) is disposed generally in the same horizontal plane as the pivotal axis of the latch member L. In some cases it is desirable to locate the handle or push button at a higher point on the side wall of the door than the pivot point of the latch member and Figures 16, 17 and 18 illustrate a latch mechanism in which the detent D' has a transversely extending arm portion 70 and a downwardly extending longitudinal arm portion 71, similar to arms 20 and 21, respectively, and an upwardly extending longitudinal arm portion 72. The flange 73 corresponds to flange 21' of the previously described forms of my invention but extends the full length of both longitudinal arm portions 71 and 72.

The detent D' may be moved from its full line latch holding position of Figure 16 into its phantom line latch released position by an outward force or pull exerted on the longitudinal arm 72. The handle mechanism shown in Figures 16 and 17 is adapted to effect this operation and includes an outside pull handle 74 pivotally mounted on the door at 75 and having an inwardly extending finger 76 which engages the leg 77 of bell crank lever 78. The pin 79 is mounted on a suitable frame structure carried by the door and forms a pivotal support for bell crank 78 and springs 80 urge the bell crank 78 and handle 74 toward their normal or retracted positions seen in full lines in Figure 17. The other leg 81 of bell crank 78 extends behind the flange 73 of longitudinal arm 72 of detent D'. It will be seen from Figure 17 that outward movement of handle 74 into its phantom line unlatching position will cause corresponding outward movement of leg 81 which will move the longitudinal arm 72 outwardly to swing the detent D' into latch released position and permit opening of the door.

A modified handle arrangement for the latch mechanism of Figure 16 is illustrated in Figure 18 in which the outside handle arm 82 is integrally formed with inside operating arm member 83 which has its end disposed behind the flange 73. Pin 84, carried by the handle frame structure, which in turn is supported by the door, forms a pivotal support for the handle unit 82—83 and springs 85 are arranged to urge the handle towards its normal or non-operating position seen in full lines in Figure 18. A stop lug 86 is adapted to engage the bezel 87 to hold the handle in its non-operating position. When the operator pulls outwardly on outside handle 82 the inner arm 83 moves therewith and engages flange 73 causing the detent D' to move into latch released position and permitting opening of the door. Either of the handle structures shown in Figures 17 and 18 may be employed with the detent D' of Figure 16 which permits the handle to be located a substantial distance away from the horizontal plane of the latching member. As the detent D' has longitudinal arm portions 72 and 73 extending in opposite directions from its pivotal center 75 it is adapted for use in installations which require either the handle location shown in Figure 3 or the handle location of Figure 16.

Although I have described the illustrated embodiments of my apparatus in considerable detail it will be understood that modifications and variations may be made in my door control mechanism without departing from the spirit of my invention. I do not, therefore, wish to be limited to the exact structures herein illustrated and described but claim as my invention all embodiments thereof coming within the scope of the appended claims.

I claim:
1. A latch mechanism including a frame structure having a base plate portion and a side flange portion extending angularly from one side of said base plate portion, a shaft journaled in said base plate portion and having its axis of rotation extending substantially normally thereto, a latch member mounted on said shaft on the side of said base plate opposite from said side flange, a latch element mounted on said shaft on the opposite side of said base plate from said latch member for rotary movement with said latch member between a latched position and an unlatched position, a latching abutment member on said latch element and radially spaced from said axis of rotation of said shaft, a limiting abutment member on said latch element angularly spaced from said latching abutment member and extending radially outwardly farther than said latching abutment, a detent member pivotally mounted on said base plate for movement between latch holding and latch released positions, said detent member including an abutment face movable into and out of position to engage said latching abutment member, means for limiting the movement of said detent member in a direction to remove said detent abutment face from engagement with said latching abutment member at a point prior to removal of said detent abutment face from the path of movement of said limiting abutment member about said shaft axis, spring means for urging said latch member and latch element toward their unlatched positions, and spring means for urging said detent toward latch holding position.

2. A latch mechanism including a frame structure having a base plate portion and a side flange portion extending angularly to and longitudinally of said base plate portion, a latch arm pivotally supported on said frame structure on the side of said base plate opposite from said side flange, a latch element supported on said frame structure on the opposite side of said base plate from said latch arm for movement with said latch arm between a latched position and an unlatched position, a detent member pivotally supported on said base plate for movement between latch holding and latch released positions and having an arm portion extending transversely of said base plate portion with an offset outer end spaced from said base plate and another arm portion extending longitudinally of said base plate portion, said side flange having an elongated detent guide slot, said offset outer end of said transversely extending arm being disposed in and guided by said slot, spring means for urging said detent toward latch holding position, a locking member pivotally supported on said side flange and having a lock arm portion extending from its pivotal support into the space between said base plate and said offset end of said transversely extending arm portion of said detent member, said lock arm portion having a projection thereon adapted, when said detent is in latch holding position, to be moved into and out of a locking position in which said projection is disposed in the path of said offset outer end of said transversely extending arm and prevents movement of said detent member into latch released position, and means for moving said locking member into and out of said locking position, said locking member having movement in a plane substantially parallel to said side flange, its locking movement being away from said base plate and its movement in unlocking direction being limited by said base plate.

3. A latch mechanism including a frame structure having a base plate portion and a side flange portion extending angularly to and longitudinally of said base plate portion, a detent member having an arm portion extending transversely of said base plate portion, a locking member pivotally supported on said side flange and having a lock arm portion extending and movable between said base plate and said transversely extending arm portion of said detent member, said lock arm portion having a projection thereon adapted, when said detent member is in a latch holding position, to be moved into and out of a locking position in which said projection is disposed in the path of said transversely extending arm and prevents movement of said detent member into a latch released position, means for moving said locking member into and out of said locking position, said locking member having movement in a plane substantially parallel to said side flange, the locking movement of said lock arm portion and projection being away from said base plate and their movement in unlocking direction being limited by said base plate, and a remote control lever member pivotally mounted on said side flange and having a portion disposed to engage said transversely extending arm of said detent on the opposite side thereof from said lock projection for actuating said detent.

4. A latch mechanism including a frame structure having a base plate portion and a side flange portion extending angularly to and longitudinally of said base plate portion, a detent member having an arm portion extending transversely of said base plate portion, a locking member supported on said side flange and extending between said base plate and said transversely extending arm portion of said detent member, said locking member having a portion thereof adapted, when said detent is in a latch holding position, to be moved into and out of a locking position in which said portion is disposed in the path of said transversely extending arm and prevents movement of said detent member into a latch released position, said locking member having locking movement away from said base plate, a remote control member movably mounted on said side flange and having a portion adapted to engage said transversely extending arm on the opposite side thereof from said portion of said locking member, and a cam member on said locking member and positioned to be disposed in the path of said remote control member when said detent is in said latch holding position and said locking member is in locked position whereby movement of said remote control member in latch releasing direction will first cam said locking member into unlocked position and then move said detent into latch released position.

5. A latch mechanism including a frame structure having a base plate portion and a side flange portion extending angularly to and longitudinally of said base plate portion, a detent member pivotally supported on said base plate for movement between latch holding and latch released positions and having an arm portion extending transversely of said base plate portion with an offset outer end spaced from said base plate, said side flange having an elongated detent guide slot, said offset outer end of said transversely extending arm being disposed in and guided by said slot, a locking member pivotally supported on said side flange and having a lock arm portion extending from its pivotal support for movement in the space between said base plate and said offset end of said transversely extending arm portion of said detent member, said lock arm portion having a projection thereon extending away from said base plate and adapted, when said detent is in latch holding position, to be moved into and out of a locking position in which said projection is disposed in the path of said transversely extending detent arm portion and prevents movement of said detent member into latch released position, the movement of said lock arm toward locking position being in a direction away from said base plate, said projection being adapted to be blocked out of said locking position by said offset portion of said transversely extending detent arm when said detent member is in latch released position, and snap-over spring means for urging said locking member toward said locking position when said projection is in engagement with and blocked by said transversely extending detent arm and away from locking position after partial movement away from such engagement in unlocking direction.

6. A latch mechanism including a frame structure having a base plate portion, a shaft member carried by said frame structure and having its axis of rotation extending substantially normally to said base plate portion thereof, a latch member carried by said shaft on one side of said base plate, a latch element carried by said shaft on the opposite side of said base plate for rotary movement with said latch member between a latched position and an unlatched position, a latching abutment member on said latch element and radially spaced from said axis of rotation of said shaft, a limiting abutment member on said latch element angularly spaced from said latching abutment member and extending radially outwardly farther than said latching abutment member, a detent member mounted on said base plate for movement between a latch holding position and a latch released position, said detent member being disposed in the path of latch releasing movement of said latching abutment member when in said latch holding position and clear of said path of latch releasing movement of said latching abutment member when in said latch released position, said detent having a portion disposed in the path of movement of said farther extending limiting abutment member when said detent is in said latch released position whereby movement of said latch element and latch member in unlatching direction is limited when said detent member is in latch released position, spring means for urging said latch member and latch element toward their unlatched positions, and spring means for urging said detent toward said latch holding position.

7. A latch mechanism including a frame structure having a base plate portion, a shaft member carried by said frame structure and having its axis of rotation extending substantially normally to said base plate portion thereof, a latch member carried by said shaft on one side of said base plate, a latch element carried by said shaft on the opposite side of said base plate for rotary movement with said latch member between a latched position and an unlatched position, a latching abutment member on said latch element and radially spaced from said axis of rotation of said shaft, a limiting abutment member on said latch element angularly spaced from said latching abutment member and extending radially outwardly farther than said latching abutment member, a detent member mounted on said base plate for movement between a latch holding position and a latch released position, said detent member having an abutment portion disposed in the path of movement of said latching abutment member when said detent member is in said latch holding position and disposed clear of said path of movement of said latching abutment member when said detent member is in said latch released position, said detent abutment portion being disposed in the path of movement of said farther extending limiting abutment member when said detent is in said latch released position whereby movement of said latch element and latch member in unlatching direction is limited by said detent when in latch released position, spring means for urging said latch member and latch element toward their unlatched positions, and spring means for urging said detent toward said latch holding position.

8. A latch mechanism including a frame structure having a base plate portion and a side flange portion extending angularly to and longitudinally of said base plate portion, a latch member pivotally supported on said frame structure on the side of said base plate opposite from said side flange, a latch element supported on said frame structure adjacent to but on the opposite side of said base plate from said latch member for movement with said latch member between a latched position and an unlatched position, a detent member pivotally supported on said base plate for movement between latch holding and latch released positions and having an arm portion extending transversely of said base plate and another arm portion extending longitudinally of said base plate, said transversely extending arm having an offset outer end portion spaced farther from said base plate than its inner end, a lock member pivotally supported on said side flange portion for swinging movement between locked and unlocked positions, said lock member having an arm portion extending between said base plate and said offset outer end portion of said transverse detent arm, said lock member arm portion having a projection thereon adapted when said lock member is swung in a direction away from said base plate to be moved into a locking position in which said projection is disposed in the path of said offset outer end portion of said transverse detent arm, and spring means for urging said detent toward latch holding position.

9. In combination in a latch mechanism which includes a frame structure having a base plate portion and a side flange portion extending angularly to and longitudinally of said base plate portion, a latch member pivotally supported on said frame structure on the side of said base plate opposite from said side flange, a latch element supported on said frame structure on the opposite side of said base plate from said latch member for movement with said latch member between a latched position and an unlatched position, and a detent member pivotally supported on said base plate for movement between latch holding and latch released positions and having an arm portion extending transversely relative to said base plate and another arm portion extending longitudinally relative to said base plate; an outer end portion on said transversely extending detent arm offset from the inner end thereof in a direction away from said base plate, guide means for said offset outer end portion on said side flange, spring means for urging said detent toward latch holding position, a remote control lever pivotally mounted on said side flange portion and having one end positioned to engage and apply a latch releasing force to said offset outer end portion of said transversely extending arm portion of said detent member, a lock member projecting between said offset outer end portion of said detent and said base plate, said lock member having a portion disposed to engage said offset portion of said detent at a point substantially opposite, in a plane parallel to said side flange, the point of engagement of said remote control lever with said offset portion, and means for supporting said lock member on said side flange for movement of said portion thereof away from said base plate toward said offset portion into locking relation therewith and away from said offset portion toward said base plate for unlocking.

10. Door control mechanism for associated door and door frame structures comprising a latch unit including a latch arm pivotally supported on one of said structures for rotational movement between latched and unlatched positions, a keeper pin carried by the other of said structures and positioned to be engaged by said latch arm when the door is closed, detent means for releasably retaining said latch arm in engagement with said keeper pin in angularly spaced full latched and secondary latch positions, sliding wedge door holding means spaced from said keeper pin in a direction transverse to the opening and closing movement of said door and supported on the structure which carries said pin for movement in the direction of door opening and closing, said wedge having a straight elongated inclined latch arm engaging face, a curved primary door holding face on said latch arm positioned to engage said inclined face of said wedge means when said door is closed and said latch arm is in said full latched position relative to said keeper pin, and a straight elongated entering guide and secondary door holding face on said latch arm adjacent said primary door holding face and extending in door closing direction therefrom substantially parallel to said straight elongated inclined wedge face when said latch arm is in said secondary latched position, said straight elongated secondary door holding face being disposed adjacent to but spaced from said straight elongated inclined face of said wedge means toward said keeper pin and in alignment with said face of said wedge means in a direction transverse to the opening and closing movement of the door when the door and latch arm are in their secondary latched positions relative to said keeper pin whereby limited movement of said door and latch arm in a direction transverse to the opening and closing movement thereof is permitted but movement sufficient to permit said latch arm to clear said keeper pin and the door to open is prevented.

EDWIN L. ALLEN.

References Cited in the file of this patent

UNITED STATES PATENTS

| Number | Name | Date |
| --- | --- | --- |
| 125,320 | Moore | Apr. 2, 1872 |
| 1,429,256 | Ritchie | Sept. 19, 1922 |
| 1,937,520 | Lightner | Dec. 5, 1933 |
| 2,093,465 | Claud-Mantle | Sept. 21, 1937 |
| 2,094,413 | Schonitzer | Sept. 28, 1937 |
| 2,099,456 | Sweet | Nov. 16, 1937 |
| 2,156,874 | Schonitzer | May 2, 1939 |
| 2,231,075 | Lakin | Feb. 11, 1941 |
| 2,246,783 | Dall | June 24, 1941 |
| 2,270,559 | Rolph | Jan. 20, 1942 |
| 2,301,221 | Marple | Nov. 10, 1942 |
| 2,317,700 | Thompson | Apr. 27, 1943 |
| 2,376,992 | Endter | May 29, 1945 |
| 2,435,987 | Tierney | Feb. 17, 1948 |
| 2,480,688 | Allen | Aug. 30, 1949 |
| 2,552,815 | Roethel | May 15, 1951 |
| 2,569,047 | Endter | Sept. 25, 1951 |
| 2,582,923 | Dall | Jan. 15, 1952 |

FOREIGN PATENTS

| Number | Country | Date |
| --- | --- | --- |
| 25,596 | Great Britain | Nov. 13, 1906 |